United States Patent [19]

Vallomy

[11] Patent Number: 4,609,400
[45] Date of Patent: Sep. 2, 1986

[54] METHOD AND APPARATUS FOR PREHEATING CHARGE MATERIALS FOR CONTINUOUS STEELMAKING

[75] Inventor: John A. Vallomy, Matthews, N.C.

[73] Assignee: Intersteel Technology, Inc., Matthews, N.C.

[21] Appl. No.: 787,959

[22] Filed: Oct. 16, 1985

Related U.S. Application Data

[63] Continuation-in-part of Ser. No. 720,225, Apr. 5, 1985, Pat. No. 4,564,388, which is a continuation-in-part of Ser. No. 636,944, Aug. 2, 1984, Pat. No. 4,543,124.

[51] Int. Cl.[4] .............................. C21C 7/00; H05B 7/18
[52] U.S. Cl. ........................................ 75/46; 75/10.63; 75/10.66; 266/175
[58] Field of Search ........................ 75/44, 46, 10-12; 266/175; 373/60, 109

[56] References Cited

U.S. PATENT DOCUMENTS

| | | | |
|---|---|---|---|
| 3,022,157 | 2/1962 | Huntington | 75/46 |
| 3,634,065 | 1/1972 | Worner | 75/46 |
| 4,359,209 | 11/1982 | Johns | 75/46 |
| 4,457,777 | 7/1984 | MacGregor | 75/46 |

Primary Examiner—Peter D. Rosenberg
Attorney, Agent, or Firm—Ralph H. Dougherty

[57] ABSTRACT

A method and apparatus for the continuous preheating of charge materials for an electric steelmaking furnace operation including provision for preheating with both off-gas from the furnace and burners in the preheating chamber. Seals are provided to prevent uncontrolled escape of gases from the chamber, and cooling air is also heated for use elsewhere. The invention contributes to the process of continuous steelmaking, including charging and tapping while maintaining full electric power, and having good control over both quality and product chemistry.

16 Claims, 6 Drawing Figures

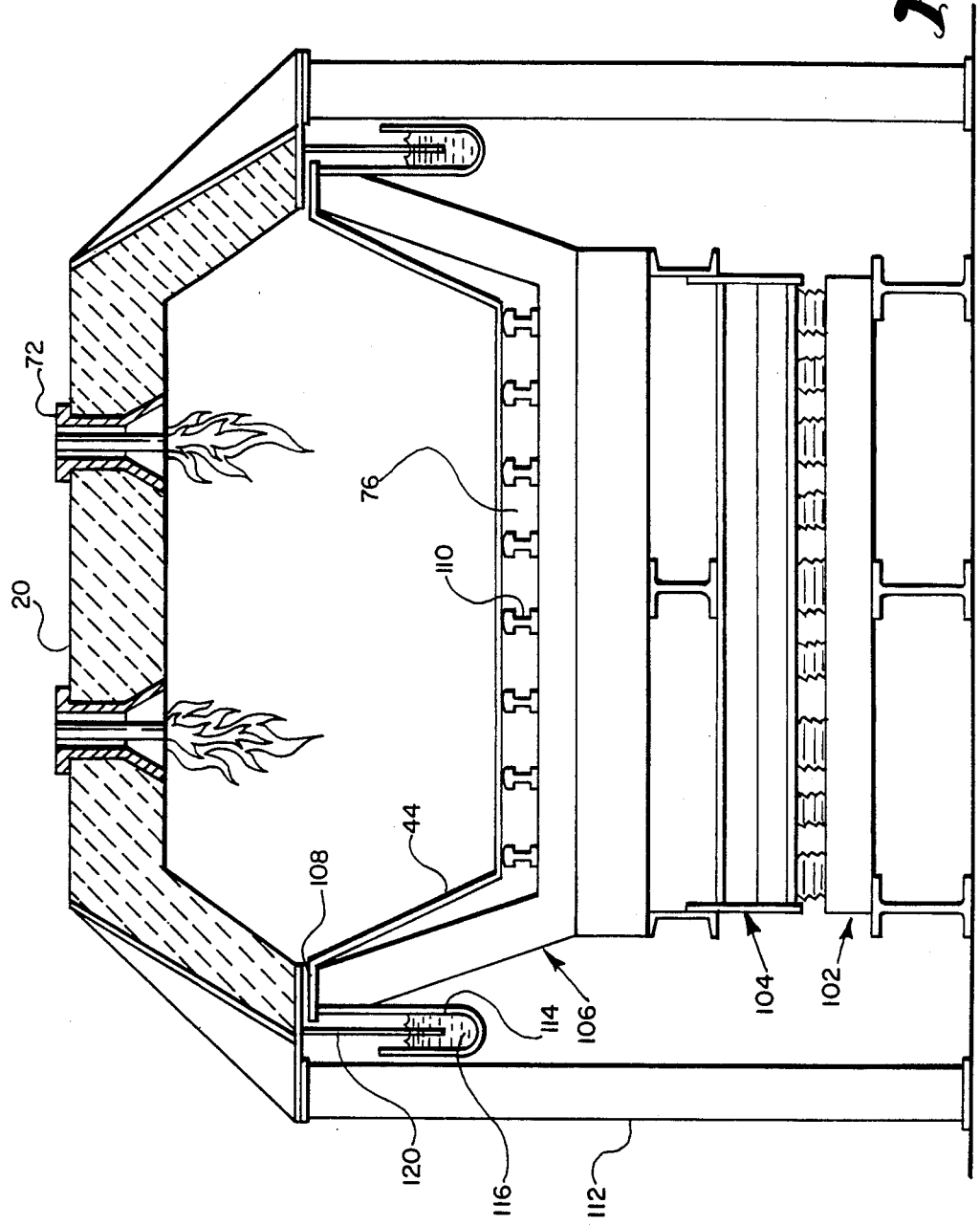

METHOD AND APPARATUS FOR PREHEATING CHARGE MATERIALS FOR CONTINUOUS STEELMAKING

CROSS REFERENCE TO RELATED APPLICATIONS

This application is a continuation-in-part of co-pending application Ser. No. 720,225 filed Apr. 5, 1985, now U.S. Pat. No. 4,564,388, which is a continuation-in-part of application Ser. No. 06/636,944 filed Aug. 2, 1984, now U.S. Pat. No. 4,543,124.

BACKGROUND OF THE INVENTION

This invention relates to the continuous melting of a metallic charge to form a molten steel product. More particularly, it relates to the continuous preheating of charge materials for continuous steelmaking. Continuous steelmaking is particularly advantageous in those regions where there is a concentration of production of, or ready availability of scrap and/or direct reduced iron (DRI), and where electric energy is both available and economical.

Heretofore, the operation of an electric arc steelmaking furnace has been an intermittent operation, wherein the sequence followed is: charging of steel scrap and/or direct reduced iron, pig iron, slag formers and alloying elements; ignition or establishment of an electric arc between the electrodes in the furnace to create melting conditions for melting the charge and forming a molten metal bath covered by a molten slag; refining for a period of time during which the molten metal portion of the bath is refined to form steel having a desired composition and quality; and periodically raising the electrodes to remove them from contact with the bath and interference with the tapping procedure; and then tapping the molten metal. In addition, slag can be removed by a slagging, or slag-off, operation as required.

Electric steelmaking technology has been undergoing radical changes for the past twenty years. The success of ladle refining for normal steel quality requirements and secondary refining for high quality requirements have increased furnace productivity, and are influencing furnace design and operation.

Between fifteen and twenty years ago, the time consuming double slag practice was replaced by rapid metallurgy, resulting in some operations having power on during up to 70 percent of the tap-to-tap time, and 70 percent of the power-on time operating at full transformer capacity.

A short time later, a productivity of one metric ton of cast steel per MVA/hour was achieved by utilizing the ultra-high power concept. However, this productivity level is still a goal for most electric steelmakers. More recently, a few steelmakers have attained a productivity of about 1.8 metric tons of cast steel per MVA/hour by combining ultra-high power with scrap preheating, oxygen lancing, oxy-fuel burners, and ladle metallurgy. Tap to tap time ranges from about 60 to 80 minutes and a somewhat unstable equilibrium is reached with both the cycles of the furnace and the caster. Even today, there is still an unstable equilibrium, because it is reached under optimum conditions of furnace operation with only minimal allowance for the many unpredictables of batch furnace operation. Thus, long sequential casting from the EAF into a continuous caster is not a common practice, but the exception.

I have invented a better method of operating an electric arc steelmaking furnace, which incorporates continuous preheating, feeding and melting, and results in an increase in quality and productivity, and reduced operating costs. This method results also in a truly continuous operation of the caster, thus insuring a continuous output of cast steel during the whole refractory campaign of the furnace. Therefore, the invention can be characterized as a method for continuous steelmaking.

Although the present invention is shown and described in connection with an electric arc steelmaking furnace, it will be readily apparent that any electric powered steelmaking furnace including but without limitation, plasma furnaces and induction furnaces could be substituted for the electric arc steelmaking furnace with like results.

There is currently a steelmaking practice known as "continuous charging" or "continuous melting", but these practices refer to a charging practice in which charge materials are fed to a furnace during the charging, melting and refining periods, then charging is interrupted and power input is interrupted for the tapping procedure. It has been found that an electric steelmaking furnace can be operated continuously without interruption of charging or power input for the tapping procedure by taking the following steps in the steelmaking process.

First, if the furnace is of a small size, scrap must be prepared by shredding or shearing it to a suitable size. The scrap is preferably segregated for quality control. Segregation of scrap eliminates or limits undesirable elements, and classifies and makes available valuable alloy constituents. For example, copper is a strong contaminant in deep drawing steels, but is a desirable addition for weathering steels such as COR-TEN steel (see Making, Shaping and Treating of Steel, pages 572–73, 9th edition, 1971). As received, the scrap is segregated into desired classifications, preferably depending on contamination by tramp elements sulfur and phosphorus. Segregated scrap is shredded or sheared and stored for use. By maintaining a stock of shredded or sheared raw material, continuous operation of the process is assured during periods of shredder or shear down-time.

Although prepared scrap is mandatory for small furnaces, commercial scrap can be fed to medium and large furnaces without preparation. The requirement for shredded or sheared scrap is strictly related to the furnace size. Furnaces of 3 meter diameter or smaller (small furnaces) require scrap of a maximum longest dimension of about one foot (0.3 meter). Furnaces of 5 meter diameter or larger (large furnaces) can be fed commercial scrap such as heavy melting Number 1 or No. 2, plate and structural scrap, and any equivalent sized scrap. Medium sized furnaces, between 3 to 5 meter diameter, should be fed a mix of shredded, sheared, and commercial scrap.

Direct reduced iron is normally prepared in the form of lumps or pellets, which are generally of a size of less than about one half inch diameter. Direct reduced iron briquets can also be used as feed material. Preferably such direct reduced iron is produced at a contiguous plant.

Scrap, direct reduced iron, slag formers and alloying materials are preheated in accordance with this invention, and continuously fed to the electric arc furnace. A foaming slag practice is used, and the furnace is only partially tapped intermittently without removal of the electrodes, thus electrodes remain at full power during both continuous feeding, refining (which is continuous) and tapping (which is intermittent). Tapping is carried out by limited tilting of the furnace, generally not varying more than 15° from the vertical.

SUMMARY OF THE INVENTION

The present invention is a method and apparatus for continuously preheating the charge materials for the continuous refining of steel. Iron-bearing scrap in shredded, sheared or granular form, direct reduced iron, commercial scrap, or a mixture thereof, forms the principal part of the charge, which is passed continuously through a preheating chamber. Heat is provided by burners in the roof of the chamber directed downwardly against the charge. Additional heat may be provided by hot off-gases from the melting furnace being passed over the charge. Cooling air is passed beneath the charge during preheating to preheat the air for use as combustion air to the burners, and to cool the portion of the conveyor in contact with the charge.

OBJECTS OF THE INVENTION

It is the principal object of this invention to provide a method and apparatus for the continuous preheating of charge materials to an electric steelmaking furnace.

It is also an object of this invention to provide a method and apparatus for continuous preheating of charge materials useful in conjunction with continuous feeding to a metal melting and refining furnace.

It is another object of this invention to provide an efficient continuous charge preheater which will utilize off-gases from the associated steelmaking furnace to provide a portion of the heat required for preheating.

It is another object of this invention to provide apparatus for preheating a furnace charge, which will simultaneously preheat cooling air for use elsewhere.

BRIEF DESCRIPTION OF THE DRAWINGS

The foregoing and other objects will become more readily apparent by reference to the following detailed description and the appended drawings, in which:

FIG. 6 is a schematic cross section of the invented charge preheater taken along the line 6—6 of FIG. 3.

DETAILED DESCRIPTION

Figure 1:
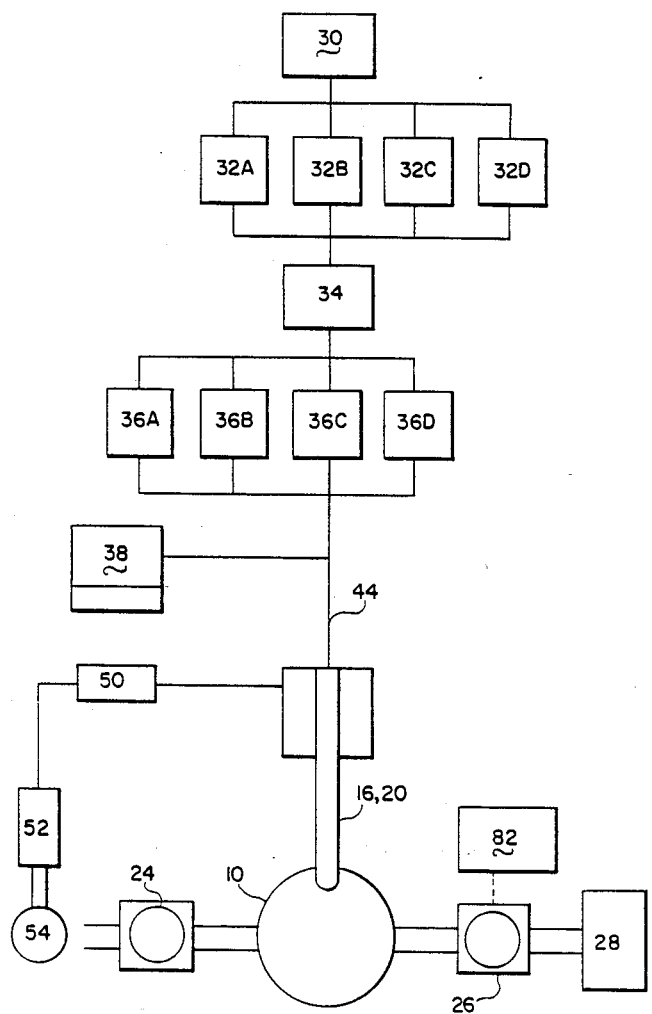
FIG. 1 is a schematic diagram of the steps and equipment in a continuous steelmaking operation, including those relating to charge preheating.
Figure 2:
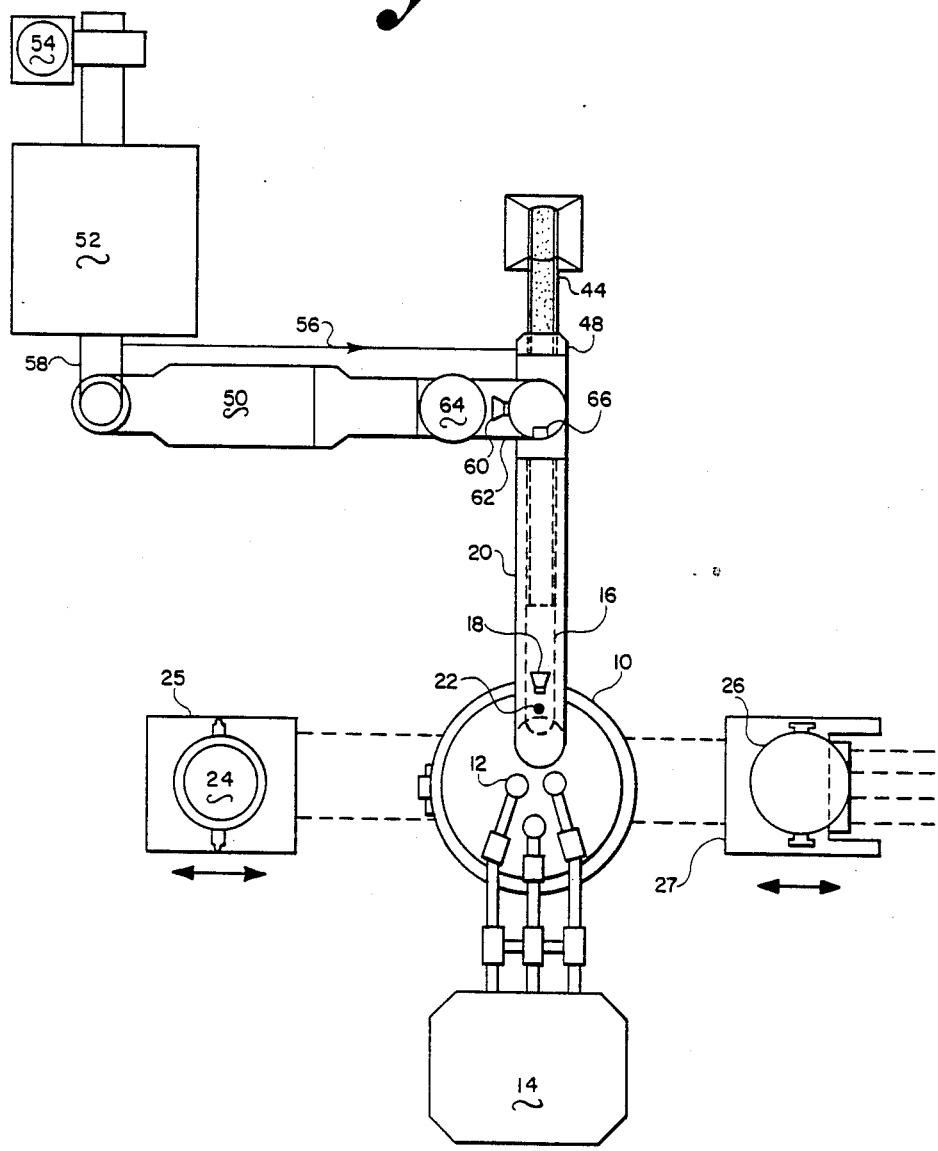
FIG. 2 is a schematic plan view of an electric arc furnace and all associated equipment as utilized in the present invention.

Referring now to the drawings, an electric arc steelmaking furnace 10 has three electrodes 12 protruding downwardly into the furnace. These electrodes are powered by a transformer (or power source) 14. A covered conveyor 44, preferably a vibrating channel, is provided for introducing charge materials, both metallics and nonmetallics, into the furnace.

A chute 16, following the conveyor 44, is also covered and contains a burner 18, for preheating the charge material and burning off combustible matter. The chute is preferably a water cooled channel. The conveyor 44 is covered by a segmented refractory 20 to form a passageway for off-gases from the furnace, which passageway acts as a preheating tunnel or preheating zone.

An oxygen sensor 22 is located within or at the exit of the tunnel 20 to determine the amount of oxygen in the off-gas passing through the tunnel, to allow the operation to maintain the off-gas reducing in character, and avoid reoxidation of the feed. For deslagging purposes, a slag pot 24 is provided on a rail-mounted transfer car 25 for moving into and out of slagging position, and for tapping purposes, a steel ladle 26 is also provided on a transfer car 27 for moving into and out of tapping, ladle metallurgy, and pouring positions. The ladle can be teemed directly into a continuous caster 28.

Raw material handling equipment includes scrap receiving station 30, scrap segregation areas or bins 32A, 32B, etc., and a mobile crane for charging raw materials to a shredder or shear 34. The shredder/shear 34 discharges onto a conveyor which transfers the small segregated scrap to corresponding segregated scrap storage areas 36A, 36B, etc. DRI and/or pig iron are stored in area 38. A second crane is provided for charging material from storage areas 36 and 38 onto a conveyor 44. As mentioned above, scrap shredding and shearing is required only for small furnaces. The conveyor enters the tunnel 20 through a dynamic gas seal 48. Gas handling equipment is connected to the tunnel near gas seal 48.

The hot off gas treating system includes a connection to the tunnel, a boiler 50, bag house 52, stack 54, and associated piping. Pipe 56 connecting the gas pipe 58 between the boiler and bag house provides seal gas for the gas seal at the tunnel entrance. Alternatively, the high pressure for the dynamic seal is provided by the combusted gas from one or more burners 70. A burner 60 in gas passageway 62 heats and melts particulates within the gas which then precipitate into slag pit 64. An oxygen sensor 66 is provided within the gas off-take from the tunnel to determine the fuel-air ratio required by burner 60 for complete combustion of the off-gas.

The furnace 10, although shown as a three phase electric arc furnace, alternatively can be a direct current electric furnace, a plasma furnace or an induction furnace.

Heretofore, no tapping practice would allow continuous melting over a continuous 24-hour period. The present invention allows continuous charging and refining with full power to the furnace by tilting the furnace no more than 15° for deslagging and tapping. To allow continuous operation at full power, with the electrodes remaining in contact with the bath, and without damage to the furnace bottom, a molten metal heel is maintained within the furnace, having approximately the same volume as that of the molten metal removed by each tapping, or each heat. That is, a molten metal heel of approximately 40 to 50% of the maximum bath height should be retained after tapping.

Figure 3:
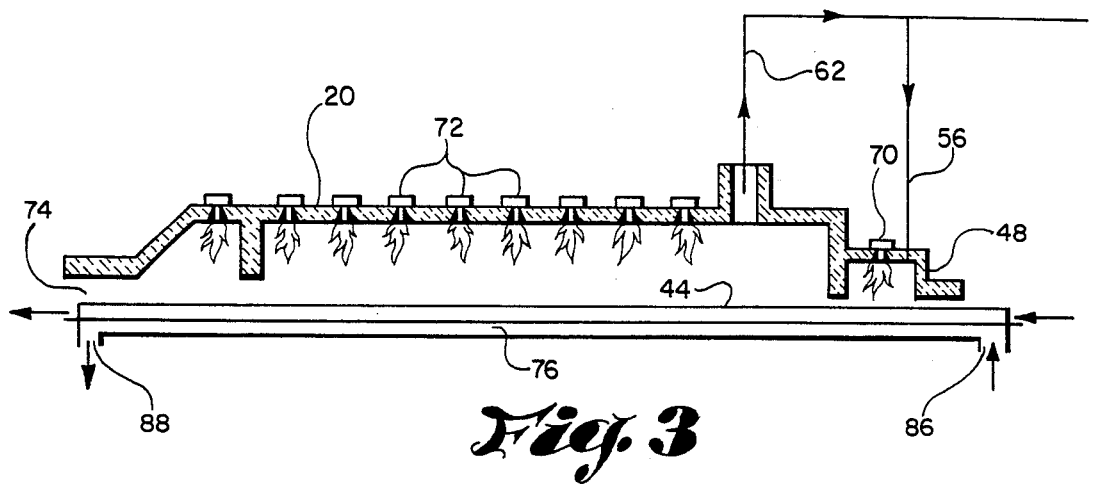
FIG. 3 is a schematic longitudinal section of a preferred embodiment of a charge preheater.

Referring now to FIG. 3, which depicts the preferred embodiment of the charge preheater apparatus, vibrating channel 44 acts as the conveyor. A dynamic seal 48 at the material entry end of the conveyor is formed by a chamber having one or more burners 70 therein to maintain sufficient pressure within the seal chamber to prevent outside air from entering it. Alternatively, combusted, pressurized gas can be used to form the dynamic seal. A multiplicity of burners 72 are spaced at intervals within the refractory tunnel or cover 20 to provide heat to the charge materials. Furnace off-gas from furnace 10 enters the refractory tunnel through material discharge opening 74. Cooling air for the vibrating channel 44 is introduced through air intake 86 and passed beneath the liner of the vibrating channel 44 through air passageway 76, the air traveling the same direction as the material being conveyed. Heated air is removed through air off-take 88 and utilized as combustion air for the burners 70 and 72. In this embodiment, the furnace off-gas provides heat to the charge preheater in two manners; first, by convection as it passes over the charge materials, and second, by releasing additional heat of combustion as the carbon monoxide and hydorcarbons within the furnace off-gas burn, providing additional fuel for the burner flames.

Figure 4:
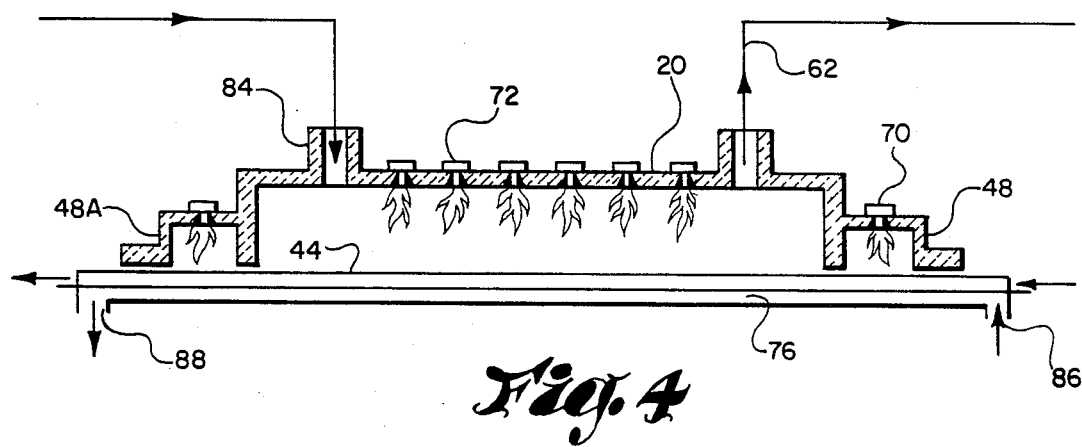
FIG. 4 is a schematic longitudinal section of an alternative embodiment to that of FIG. 3.

The embodiment of FIG. 4 has a dynamic seal 48 at the material entrance into the charge preheater and another dynamic seal 48a at the material exit end which leads to the furnace 10. Furnace off-gas is introduced to the charge preheater through off-gas intake 84. The hot gases are removed from the charge preheater to the bag house through gas off-take 62. In this embodiment, the fresh cooling air is introduced beneath the conveyor through fresh cooling air intake 86, passes through air passageway 76, and exits from hot gas off-take 88.

Figure 5:
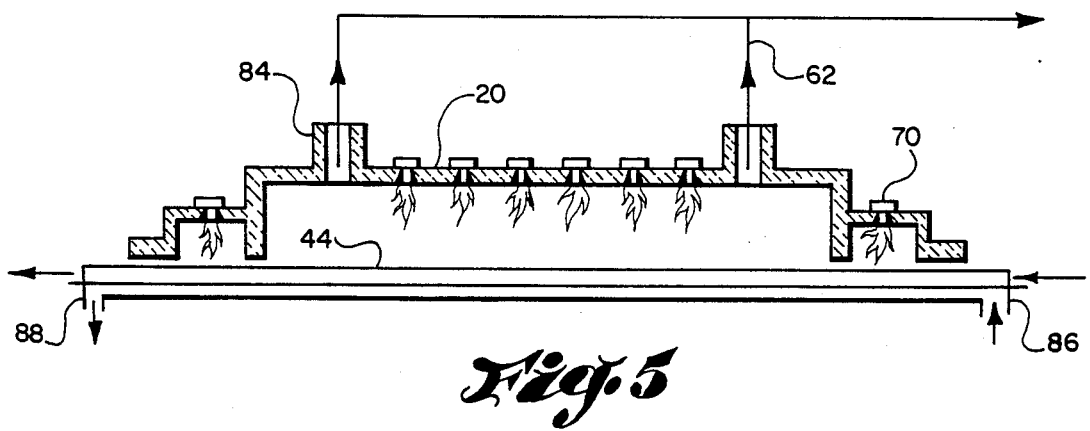
FIG. 5 is a schematic longitudinal section of another alternative embodiment of a charge preheater.

The embodiment of FIG. 5 has the same structural arrangement as that of FIG. 4. However, no furnace off-gas is introduced to tunnel 20. All heat is provided by the burners 70 and 72, and the products of combustion from the burners are removed through both gas passageways 62 and 84 to bag house 52. The fresh cooling air intake 86 is located at the material feed end of the conveyor and heated air is removed through conduit 88.

The cross-section of the charge preheater shown in FIG. 6 clarifies many of the details of the apparatus. Base 102 supports a standard vibrating mechanism 104 to which the vibrating channel support 106 is fixed. The liner of the vibrating channel 44, which is preferably made of stainless steel, has flanges 108 which rest atop support 106. In addition, rails or beams 110 provide additional support to the conveying channel as well as forming a gap or passageway 76 for longitudinal passage of combustion air therethrough to cool channel 44. Refractory block cover 20 forms the top of the tunnel for the conveyer. The cover 20 is removable for access to the conveyer. One or more rows of burners 72 are positioned within the refractory cover. The cover is supported by columns 112. Conveyor support 106 has fixed to it a water-carrying channel 114, which is accessible to the exterior of the charge preheater for filling with water 116, or for cleaning of foreign matter from the channel. A gas seal is formed by a downwardly extending seal member 120 fixed to the lower edge of the cover extending into the water 116 within the channel 114.

Charge material for continuous melting is ferrous scrap, pig iron and direct reduced iron in pellet or briquet form. Scrap is separated by grades of purity, shredded or sheared to suitable size, if necessary, for continuous feeding into the furnace and stored by grade until required for feeding. Pig iron is granulated or broken into appropriate size for feed stock.

Charge material is selected from the stored shredded or sheared material and other feed stock, weighed and fed onto a conveyor. Preferably, the charge material is weighed on a weighing conveyor. The charge material is preheated by burners 72 in tunnel 20, as well as by passing furnace off-gas through and over it, countercurrent to the flow of the charge into the furnace. A non-oxidizing atmosphere is maintained within the tunnel by establishing a dynamic seal 48 at its entry end. An oxygen sensor 22 indicates whether the off-gas is sufficiently reducing in character to prevent oxidation of the charge, and controls the adjustment of burners within the tunnel. If necessary, a reducing flame is used in the tunnel. Non-metallic combustible matter in the charge is burned off, and the charge is heated to at least 500° C., and to a maximum temperature of approximately 800° to 1000° C. (1500° to 1830° F.). The burner 18, positioned at the end of chute 20, provides the additional heat necessary to raise the charge temperature to the desired range for introduction to the furnace of 800° to 1000° C. (1500° to 1830° F.).

The steelmaking furnace operates continuously at full power for an extended period of time up to approximately six or seven days during which time no repairs are made to the furnace. After this time the furnace is shut down and the entire crucible or the upper part of the split shell is replaced.

The furnace is operated with a heel of molten metal approximately equal in weight to the tonnage removed at each tapping. This protects the bottom of the furnace from high power input during and immediately after tapping.

The charging, or feed, rate is determined by the desired temperature fluctuation of the bath. As tapping time is approached, the feed rate to the furnace is decreased for a few minutes before tapping. By reducing the chilling effect of the charge on the bath, the bath temperature is increased to the desired tapping temperature.

Slag is kept in the foaming condition during all phases of the process, including the tapping phase, and full power is maintained to the furnace during tapping. Foaming slag is caused by the liberation of CO and $CO_2$ within the slag. The carbon necessary for reaction with the oxygen (oxide) in the charge is injected into the slag or slag-metal interface of the bath in the form of powdered carbon or coke through one or more underbath tuyeres. If there is insufficient oxygen present in the bath, oxygen can also be injected through underbath tuyeres to effect the necessary reaction with carbon to promote a foaming slag. Carbon and/or oxygen may be injected into the bath at any time.

Dephosphorization, oxidation, partial desulfurization, and carburization are carried out within the furnace. However, deoxidation, final desulfurization, and alloying are accomplished in the ladle after tapping, by a process known as ladle metallurgy, such additions being made from ladle metallurgy area 82. The steel in the ladle is free of molten slag, and alloying elements can be added during the tapping procedure when common steel grades are being produced. Slag formers are added while gas is bubbled through the steel to promote homogeneity and cleanliness.

In order to tap the furnace, it is tilted up to 15° from the normal vertical position. The furnace can be tapped by any of several tapping devices or techniques, but it is preferably tapped through a slideable gate controlled pouring hole arrangement. This allows provision for preventing the presence of molten slag in the ladle.

Carbon, lime, oxygen or foamy slag formers may be injected beneath the molten metal bath level or into the slag-metal interface.

When hot direct reduced iron is used as the feedstock for the charge, natural gas consumption in the charge preheater is decreased.

SUMMARY OF THE ACHIEVEMENT OF THE OBJECTS OF THE INVENTION

From the foregoing, it is clear that I have invented a method and apparatus for the continuous preheating of charge materials for use in conjunction with the operation of an electric steelmaking furnace, which allows continuous charging, tapping while maintaining full electric power, and has good control over both quality and product chemistry.

What is claimed is:

1. A method for the continuous preheating of charge materials for a steelmaking furnace, comprising;
   a. continuously passing a desired mixture of sized iron-bearing material and other feed materials through a heating furnace;
   b. maintaining a non-oxidizing atmosphere within the heating furnace by establishing a dynamic seal at the entrance end of the heating furnace;
   c. heating the furnace and the material therein by directing burner flames downwardly onto the surface of the mixture passing through the furnace;
   d. removing the products of combustion;
   e. cooling the portion of said furnace in contact with said material mixture by passing cooling air beneath the underside of such portion of the furnace; and
   f. discharging the heated mixture continuously and directly into a steelmaking furnace.

2. A method according to claim 1, further comprising passing hot reacted gases formed in the steelmaking furnace through and over said material mixture to assist in its preheating.

3. A method according to claim 1 wherein said charge materials are both metallic and non-metallic.

4. A method according to claim 1 wherein said charge materials are preheated to at least 500° C.

5. Apparatus for the continuous preheating of charge materials for a steelmaking furnace, comprising:
   a. conveyor means; having an entry end and an exit end;
   b. support means for said conveyor means;
   c. a cover over a portion of said conveyor means, forming a heating tunnel with said support means;
   d. gas seal means at the entry end of said conveyor means to the heating tunnel;
   e. discharge means at the exit end of said heating tunnel; and
   f. means for introducing heat to the interior of said tunnel.

6. Apparatus according to claim 5 further comprising means for passing cooling air beneath said conveyor means to effect cooling of said conveyor means.

7. Apparatus according to claim 5 wherein said means to provide heat to the interior of said tunnel includes burners positioned in said cover.

8. Apparatus according to claim 5 wherein said conveyor means is a vibrating channel.

9. Apparatus according to claim 5 wherein said support means includes a longitudinal seal means parallel to the direction of movement of said conveyor means.

10. Apparatus according to claim 9 wherein said seal means is a water-containing channel attached to said support means and a downwardly extending seal member fixed to the underside of the extremities of said cover, and terminating within said water-containing channel beneath the level of water therein.

11. Apparatus according to claim 5 wherein said gas seal means is a dynamic seal chamber having a positive pressure therein.

12. Apparatus according to claim 11 wherein said dynamic seal chamber has a burner therein.

13. Apparatus according to claim 5 further comprising means for introducing hot furnace off-gases from an associated metal refining furnace to the interior of said preheating tunnel.

14. Apparatus according to claim 5 further comprising means for removing exhaust gases from said tunnel.

15. Apparatus according to claim 5 further comprising a dynamic seal at the exit end of said tunnel.

16. Apparatus according to claim 6 wherein said means for passing cooling air beneath said conveyor means has an air intake beneath the entry end and a heated air discharge beneath the exit end.

* * * * *